United States Patent [19]

Tharp

[11] Patent Number: 4,839,053
[45] Date of Patent: Jun. 13, 1989

[54] BIOMASS GROWTH PROCESS WITH SEPARATE AERATION AND MEDIA COMPARTMENTS

[75] Inventor: Charles E. Tharp, Columbia, Mo.

[73] Assignees: Ashbrook-Simon-Hartley Corp., Houston, Tex.; Simon-Hartley, Manchester, England

[21] Appl. No.: 102,672

[22] Filed: Sep. 30, 1987

[51] Int. Cl.$^4$ ............................ C02F 3/04; C02F 3/08
[52] U.S. Cl. ................................ 210/616; 210/617; 210/150
[58] Field of Search ............... 210/617, 616, 618, 150, 210/151, 295, 615

[56] References Cited

U.S. PATENT DOCUMENTS

| | | | |
|---|---|---|---|
| 2,071,591 | 2/1937 | Tholin | 210/616 |
| 3,968,034 | 7/1976 | Tymoszczuk | 210/261 |
| 4,045,344 | 8/1977 | Yokota | 210/151 |

FOREIGN PATENT DOCUMENTS

| | | | |
|---|---|---|---|
| 2841011 | 4/1980 | Fed. Rep. of Germany | 210/151 |
| 51-8168 | 1/1976 | Japan | 210/151 |
| 53-18242 | 2/1978 | Japan | 210/150 |
| 53-39654 | 4/1978 | Japan | 210/151 |
| 61-136490 | 6/1986 | Japan | 210/150 |

*Primary Examiner*—Benoit Castel
*Attorney, Agent, or Firm*—Foley & Lardner, Schwartz, Jeffery, Schwaab, Mack, Blumenthal & Evans

[57] ABSTRACT

A process and an apparatus is provided for growing biomass from a supply of nutrient in a manner which permits precise control of the biomass growth environment. A reaction vessel includes a media-free compartment and a media compartment which retains biomass support bodies. A screen separates the two compartments. Nutrient is circulated through the media compartment, passed through the screen and is oxygenated and/or re-circulated between said compartments. As shown in FIG. 3, additional pairs of media-free and media compartments can be connected in series to provide a single reaction vessel. Suspended or packed biomass support bodies can be used and can be continuously or intermittently removed for cleaning.

4 Claims, 2 Drawing Sheets

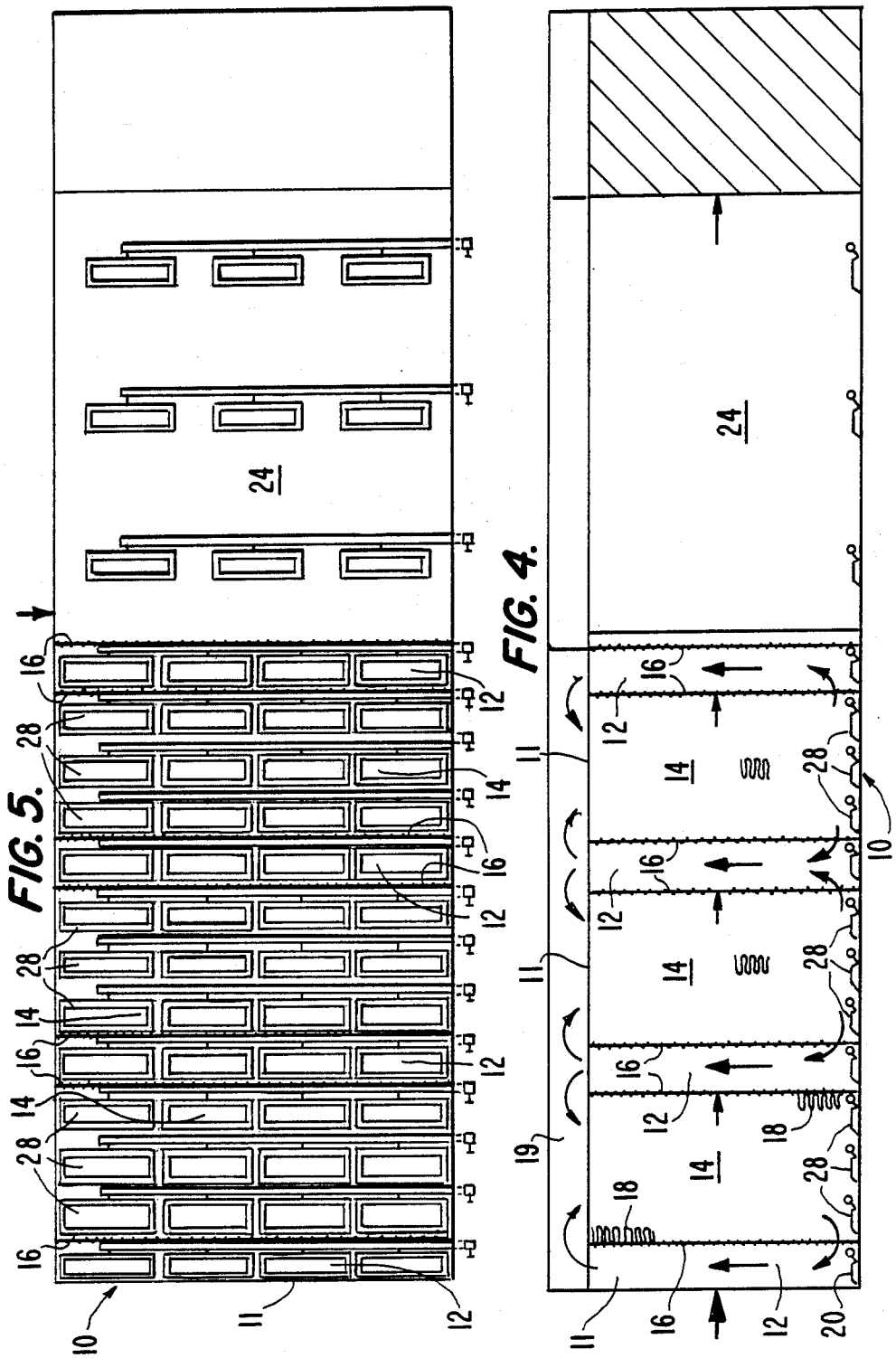

BIOMASS GROWTH PROCESS WITH SEPARATE AERATION AND MEDIA COMPARTMENTS

BACKGROUND OF THE INVENTION

1. Field of the Invention

This invention relates to a process and apparatus for enhancing the growth of biomass within a reaction vessel and, in particular, enhancing biomass growth in reaction vessels which handle effluent and sewage.

2. Discussion of the Prior Art

In recent years, a process for treating industrial effluent and sewage involving the use of biomass support bodies has shown itself as an attractive alternative to the conventional activated sludge treatment process. In the conventional process, sewage or industrial effluent in a reaction vessel is aerated and agitated to stimulate the metabolism of a biological population within the vessel with various impurities in the effluent. The secondary sludge produced by this interaction is removed by sedimentation In the biomass support body process, the reaction vessel is a vertical structure and it contains a number of free moving biomass support bodies Effluent and air are introduced at the base of the vessel and, as the effluent is oxygenated and propelled upward by the air, the biological population in the biomass support bodies reacts with the oxygenated effluent to produce carbon dioxide and additional biomass. This process is described in detail in U.S. Pat. No. 4,419,243 which also describes a suitable apparatus for accomplishing the process.

The biomass support body process has demonstrated that the capacity of the reaction vessel used in the process for a given through flow of effluent can be approximately one fifth of that of a conventional aeration tank and so the process offers commensurate savings in the cost of an effluent treatment plant. However, even more savings could be achieved if the critical variables of the biomass growth process, such as the pH level, control of recirculated solids and control of biomass populations, could be more precisely controlled. Additionally, it would be desirable to completely control the movement of the biomass support bodies through the vessel independent of the flow of effluent as opposed to relying on the upward flow of the effluent to suspend or fluidize the bodies, as is required in the existing biomass support processes. Furthermore, a wider choice of materials and construction of the support bodies could be available if there were no requirement that biomass support bodies be suspended or fluidized.

SUMMARY OF THE INVENTION

Accordingly, this invention provides a process and an apparatus for optimizing the use of biomass support bodies to treat effluent or sewage in a reaction vessel. A process according to the invention comprises flowing effluent into a media compartment having a number of biomass support bodies, circulating the effluent through a screen into a media-free compartment and re-circulating the effluent back into the media compartment or into successive media compartments. Biomass growth occurs on the biomass support bodies as the effluent passes through the media compartment and contacts the bodies. The means for re-circulating the effluent can comprise means for aerating the effluent as well.

An apparatus according to the invention comprises a media compartment and a media-free compartment, each compartment having an open face and connected along their open faces with a screen interposed at the point of interconnection. A diffuser can be provided at the base of the media-free compartment to aerate and upwardly propel effluent which passes through the media compartment and into the media-free compartment.

It is an object of this invention to provide precise control of the nutrients, environment, biomass equilibrium and optimization of the total treatment of various biological fermentation processes which occur in a reaction vessel.

It is a further object of this invention to provide a reaction vessel to treat higher bio-chemical oxygen demand rates than can be treated by a conventional activated sludge plant.

It is an additional object of this invention to provide a process and an apparatus permitting control of the movement of biomass support bodies within a reaction vessel.

It is yet a further object of this invention to provide a process and an apparatus for treating effluents which avoids hydraulic stratification of biomass support bodies.

It is yet a further object of this invention to provide a process and an apparatus for treating effluents by offering favorable heat conservation features.

BRIEF DESCRIPTION OF THE DRAWINGS

FIG. 4 shows a cutaway elevational view of the apparatus of FIG. 3 and further including an activated sludge zone and a suspended growth zone; and FIG. 5 shows a top view of the apparatus of FIG. 4.

DETAILED DESCRIPTION OF THE PREFERRED EMBODIMENTS

Figure 1:
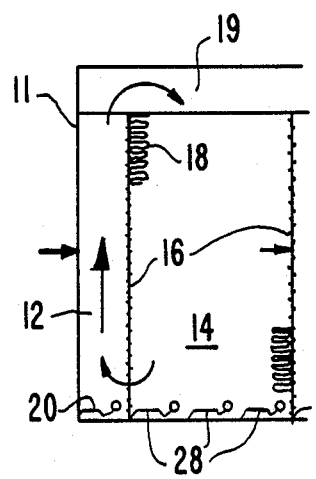
FIG. 1 shows a cutaway elevational view of a treatment assembly.

With reference first to FIG. 1, a reaction vessel 10 comprises a number of treatment assemblies 11 arranged side by side and connected in a manner further described below. The treatment assemblies 11 will be discussed with regard to one such assembly and it is to be understood that the other treatment assemblies 11 are identically configured. Each treatment assembly 11 comprises a media-free compartment 12 having a screen 16 along one vertical side and a media compartment 14 which shares screen 16 as a vertical side. At the base of media-free compartment 12 are a number of aerators or diffusers which provide a selectively variable flow of air into the compartment. A number of supplemental diffusers 28 are provided at the base of media compartment 14. Each media compartment 14 can be provided with a second screen as another vertical side and the second screen is also a vertical side of the media-free compartment of a contiguous treatment assembly 11. Accordingly, a number of treatment assemblies 11 can be arranged in a horizontal series with each media compartment 14 defined by a screen 16 separating the media compartment from the media-free compartment 12 of the assembly and by a second screen separating the media compartment from the media compartment of a contiguous treatment assembly 11. Apart from the screens 16, the vertical sides of each treatment assembly 11 are watertight and are sealed to the base of reaction vessel 10. In one preferred embodiment, the tops of each treatment assembly are uncovered, but in all embodiments an open space 19 is provided along the tops of the vertical sides of treatment assemblies 11.

A number of biomass support bodies 18 are housed in each media compartment 14. The bodies 18 can be constructed of ceramic, rock, porous plastic, sponge or formed plastic as dictated by the nature of the effluent and the treatment objectives.

The treatment of effluent or sewage by handling in reaction vessel 10 is as follows. Effluent (not shown) is pumped into open space 19 above the media compartment 14 of the first treatment unit 11. Under the action of its own weight and, shortly thereafter, the action of recirculated, unreacted effluent as well, the effluent flows downward in the media compartment and contacts the biomass support bodies 18. This contact produces an increase in biomass as nutrient leaves the effluent to produce more biomass. As the unreacted effluent nears the base of media compartment 14, it is drawn through screen 16 into media-free compartment 12. The upward air flow from diffusers 20 oxygenates and propels the unreacted effluent up media-free compartment 12 until the unreacted effluent spills over the top of screen 16 and again into the top of media compartment 14.

Figure 2:
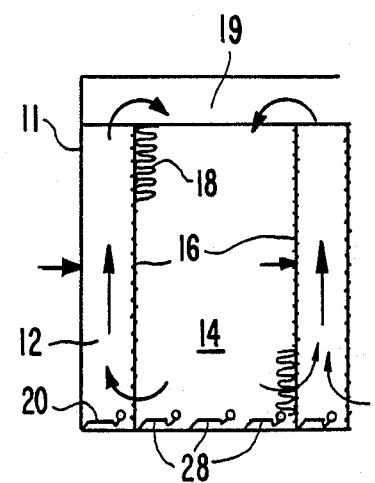
FIG. 2 shows a cutaway elevational view of a treatment assembly and including a second media-free compartment.
Figure 3:
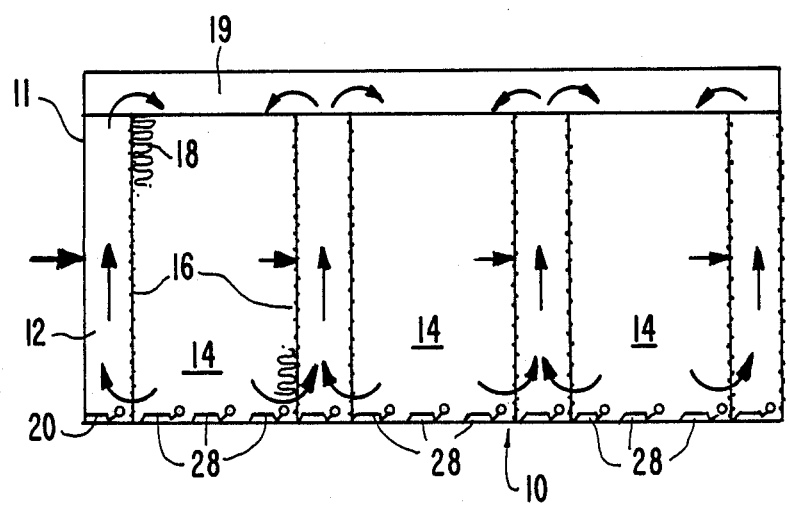
FIG. 3 shows a cutaway elevational view of a number of treatment assemblies connected in series.

While the effluent is being pumped into the media compartment of the first treatment assembly 11, an upward airflow is simultaneously being generated in the media-free compartment 12 of the next, contiguous treatment unit 11. This structure is shown in FIG. 2. As noted, the media compartment 14 shares a common screen with the contiguous media-free compartment 12 of the next treatment assembly 11. Thus, some of the unreacted effluent is drawn into and propelled up the next media-free compartment. The upwardly propelled effluent spills over the top of the media-free compartment and into both the media compartment of the first treatment assembly and the media compartment of the second treatment assembly.

The simultaneous action of the downwardly flowing effluent in the media compartments being fed by the effluent spilling over from the media-free compartments creates an overall net hydraulic flow, from left to right of FIG. 1, through the treatment assemblies 11. As the effluent passes down each successive media compartment 14, nutrients in the effluent react with the biological populations in the biomass support bodies 18.

As can be appreciated, a reaction vessel comprising a number of treatment assemblies 11 can be controlled and modified to precisely tailor the treatment environment. Variables such as the acidity of the treatment environment, the control of recirculated solids, control of biomass density and selective removal or treatment of sludge can be precisely controlled. Media compartments 14 can be partially or completely filled with bodies 18. If media compartments 14 are completely filled with bodies 18 so as to create a packed bed reactor, the biomass will operate in a fixed film mode with the biomass being retained in the bodies 18. On the other hand, a suspended growth mechanism can be achieved by partially filling the media compartments 14 with bodies 18 so that the bodies move with respect to one another and with respect to the screens 16.

Additional oxygenation of the downwardly flowing effluent for superior oxygen transfer efficiency and reduced energy consumption can be provided through operation of supplemental diffusers 28 located at the base of each media compartment 14. Supplemental diffusers 28 can be operated to agitate the bodies 18 in selected media compartments which are completely filled with such bodies so as to cause excess biomass to be shaken loose so it can thereafter be removed. Means for slightly aerating or circulating the effluent can be provided to fluidize the bodies.

Each treatment assembly 11 can be individually stocked with bodies 18 to tailor a biological environment independent of the adjoining treatment assemblies. Additionally, the specific geometry of each treatment assembly 11 can be selected to provide a reaction vessel 10 having media compartments of varying volume.

The process and apparatus of the invention for treating effluent can also be adapted to allow continuous or intermittent removal and reinsertion of biomass support bodies 18 as, for example, the bodies become filled with biomass. Additionally, the process and apparatus of the invention can be adapted to provide an anoxic or an anaerobic environment in which circulation of the effluent is accomplished by mechanical means in lieu of diffusers 20. For example, the process and apparatus of the invention can be adapted to provide an anoxic environment by recirculating off-gases.

It is also contemplated that the process and apparatus of the invention can be structured to provide extremely high rates of recirculation. For example, it may be desirable to provide a false bottom under each of the media compartments 14, solid walls instead of screens between the aeration compartments 12 and the media compartments 14 and to recirculate effluent back along the false bottom to the first treatment assembly 11.

As shown in FIGS. 4 and 5, a further process and apparatus in accordance with the invention may include a conventional activated sludge process to further treat the effluent, such as, for example, by flocculating the effluent. The activated sludge process may, for example, take place after the effluent has circulated through the series of treatment assemblies 11.

In addition to incorporating an activated sludge process into the process of the present invention, the invention may be utilized in conjunction with other processes such as nitrification processes, denitrification processes using anoxic treatment and flocculation processes for phosphorus control.

Also, the process and apparatus of the present invention may be adapted as an independent process or apparatus used to scavenge additional carbonaceous biochemical oxygen demand (BOD). For example, a process according to the present invention could be operated following treatment of the effluent in a conventional carbonaceous BOD removal process. Since carbonaceous BOD is responsible for the bulk of cell growth in any biological process, it is contemplated that the full range of biomass support configurations could be used to provide a process which most effectively handles the cell growth.

The invention may also be used in a process or apparatus used to remove nitrogenous or ammonia BOD. The process or apparatus could be designed with the knowledge that the process of removing ammonia by converting it to nitrate compounds typically results in limited cell growth and, correspondingly, no need of filtration to handle excess solids. Of course if the nitrogenous BOD removal process results in limited cell growth, the process or apparatus of the invention can also operate with limited solid accumulation in the biomass support bodies without the need for periodic removal of biomass.

Although the invention has been described with respect to certain embodiments, it is understood that other embodiments and modifications can be made without departing from the scope or spirit of the invention.

What is claimed is:

1. A horizontal flow process for enhancing the growth of biomass comprising the steps of:
   connecting an open face of a media-free compartment with the open face of a media compartment;
   positioning a screen at the location of the connection of said compartments;
   depositing a number of biomass support bodies in said media compartment;
   circulating effluent comprising liquid and nutrient through said media compartment so that said effluent passes into contact with said biomass support bodies, thereby allowing some of the nutrient to contribute to the growth of biomass;
   permitting said effluent to pass horizontally through said screen into said media-free compartment;
   recirculating by means of a mechanical fluid circulator said effluent passing into said media-free compartment through said media compartment; and
   successively repeating the effluent circulation and recirculation process through additional alternately interconnected media compartments and media-free compartments, with screens positioned therebetween at the points of intersection.

2. The horizontal flow process of claim 1, further including the step of passing the effluent into a compartment where flocculation thereof occurs.

3. The horizontal flow process of claim 1, further including the step of passing the effluent into a liquid/solids separating device.

4. A horizontal flow apparatus for enhancing the growth of biomass from effluent, said effluent containing liquid and nutrient, comprising;
   a plurality of media-free compartments each having a means for producing an upwardly circulating effluent and each having an open face;
   a plurality of media compartments retaining a plurality of biomass support bodies therein, each having an open face, said media compartments and said media-free compartments being alternately horizontally interconnected along their respective open faces for the successive circulation of effluent therethrough; and
   a screen positioned at each interconnection of said media-free compartment and said media compartment, whereby a portion of the effluent contributes to biomass growth as it passes through said first media compartment while the remaining portion of the effluent passes through said screen into said first media-free compartment to be recirculated through said first media compartment.

* * * * *